US011536439B2

(12) United States Patent
Nakabayashi et al.

(10) Patent No.: US 11,536,439 B2
(45) Date of Patent: Dec. 27, 2022

(54) PLANAR LIGHT SOURCE WITH THROUGH HOLE AND ADJUSTING MEMBERS

(71) Applicant: NICHIA CORPORATION, Anan (JP)

(72) Inventors: Takuya Nakabayashi, Tokushima (JP); Toru Hashimoto, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/163,485

(22) Filed: Jan. 31, 2021

(65) Prior Publication Data

US 2021/0239296 A1    Aug. 5, 2021

(30) Foreign Application Priority Data

Jan. 31, 2020  (JP) .............................. JP2020-015664
Sep. 25, 2020  (JP) .............................. JP2020-160936

(51) Int. Cl.
*F21V 9/30*   (2018.01)
*F21V 8/00*   (2006.01)
*G02F 1/13357* (2006.01)
*F21Y 105/16* (2016.01)
*G02F 1/1335* (2006.01)

(52) U.S. Cl.
CPC ............. *F21V 9/30* (2018.02); *G02B 6/0021* (2013.01); *G02B 6/0025* (2013.01); *G02F 1/133606* (2013.01); *F21Y 2105/16* (2016.08); *G02B 6/0043* (2013.01); *G02B 6/0051* (2013.01); *G02B 6/0073* (2013.01); *G02F 1/133603* (2013.01); *G02F 1/133614* (2021.01)

(58) Field of Classification Search
CPC ........ F21V 9/30; G02B 6/0021; G02B 6/0025
See application file for complete search history.

(56) References Cited

U.S. PATENT DOCUMENTS 7,654,687 B2 *  2/2010  Tsai ..................... G02B 6/0021
                                                            362/97.3
2008/0303411 A1  12/2008  Ohta et al.
(Continued)

FOREIGN PATENT DOCUMENTS

EP    3547377 A1  10/2019
EP    3579273 A1  12/2019
(Continued)

*Primary Examiner* — Rajarshi Chakraborty
*Assistant Examiner* — Michael Chiang
(74) *Attorney, Agent, or Firm* — Hunton Andrews Kurth LLP

(57) ABSTRACT

A planar light source includes a light guide member having a through hole, a light source, a first light adjusting member, a second light adjusting member, and a light transmissive member. The first light adjusting member having reflectivity and transmissivity with respect to light from the light source is disposed on or above an upper face of the light source in the through hole. The second light adjusting member having reflectivity and transmissivity with respect to the light from the light source is disposed above and apart from the first light adjusting member. The first light transmissive member having a higher transmissivity with respect to the light from the light source than the transmissivities of the first and second light adjusting members is disposed between the first light adjusting member and the second light adjusting member, and between a lateral face of the light source and the light guide member.

15 Claims, 15 Drawing Sheets

(56) References Cited

U.S. PATENT DOCUMENTS

| | | | |
|---|---|---|---|
| 2009/0295265 A1* | 12/2009 | Tabuchi | H01L 33/56 313/112 |
| 2010/0079980 A1 | 4/2010 | Sakai | |
| 2011/0037740 A1 | 2/2011 | Yamaguchi | |
| 2011/0149594 A1 | 6/2011 | Terajima et al. | |
| 2011/0156071 A1* | 6/2011 | Cheng | H01L 33/44 257/E33.056 |
| 2011/0194034 A1* | 8/2011 | Shimizu | G02B 6/0036 348/739 |
| 2013/0140580 A1* | 6/2013 | Wirth | H01L 33/54 257/76 |
| 2013/0221389 A1 | 8/2013 | Yamamuro | |
| 2015/0155456 A1* | 6/2015 | Kuramoto | H01L 33/46 257/98 |
| 2016/0356940 A1* | 12/2016 | Ngai | F21S 8/086 |
| 2018/0309035 A1* | 10/2018 | Bando | H01L 33/486 |
| 2019/0227382 A1* | 7/2019 | Watanabe | H01L 33/00 |
| 2019/0259923 A1 | 8/2019 | Liao et al. | |
| 2019/0294005 A1 | 9/2019 | Imada et al. | |
| 2020/0049877 A1* | 2/2020 | Watanabe | G02F 1/133606 |
| 2020/0300444 A1 | 9/2020 | Lee | |

FOREIGN PATENT DOCUMENTS

| | | |
|---|---|---|
| JP | S59121374 A | 7/1984 |
| JP | 2007067204 A | 3/2007 |
| JP | 2007227286 A | 9/2007 |
| JP | 2009016779 A | 1/2009 |
| JP | 2011044425 A | 3/2011 |
| JP | 2011211085 A | 10/2011 |
| JP | 2012195350 A | 10/2012 |
| JP | 2012212532 A | 11/2012 |
| JP | 2013115280 A | 6/2013 |
| JP | 2013175531 A | 9/2013 |
| JP | 2014120660 A | 6/2014 |
| JP | 2018106826 A | 7/2018 |
| JP | 2019175847 A | 10/2019 |
| KR | 20190068657 A | 6/2019 |
| TW | I524121 B | 3/2016 |
| WO | 2010070885 A1 | 6/2010 |

* cited by examiner

PLANAR LIGHT SOURCE WITH THROUGH HOLE AND ADJUSTING MEMBERS

CROSS-REFERENCE TO RELATED APPLICATION

This application claims priority to Japanese Patent Application No. 2020-015664 filed on Jan. 31, 2020, and Japanese Patent Application No. 2020-160936 filed on Sep. 25, 2020, the disclosures of which are hereby incorporated by reference in their entireties.

BACKGROUND

The present disclosure relates to a planar light source.

Light emitting modules in which light emitting elements such as light emitting diodes are combined with light guide members are widely utilized as planar light sources, for example, backlights for liquid crystal displays. In a direct-lit backlight in which light emitting elements are arranged directly under the light guide member plate, the luminance in the regions near the light emitting elements tends to locally high. See, for example, Japanese Patent Publication No. 2011-211085 and WO2010/070885.

SUMMARY

One of the objects of the present disclosure is to provide a planar light source having less luminance non-uniformity in the emission face.

According to an embodiment of the present disclosure, a planar light source includes a light guide member, a light source, a first light adjusting member, a second light adjusting member, and a first light transmissive member. The light guide member has a first face, a second face opposing the first face, and a through hole passing through from the first face to the second face. The light source is disposed in the through hole of the light guide member. The first light adjusting member is disposed on or above an upper face of the light source in the through hole, and has a light reflectivity and a light transmissivity with respect to light emitted by the light source. The second light adjusting member is disposed above and apart from the first light adjusting member, and has a light reflectivity and a light transmissivity with respect to the light emitted by the light source. The first light transmissive member is disposed between the first light adjusting member and the second light adjusting member, and between a lateral face of the light source and the light guide member. The first light transmissive member has a higher light transmissivity with respect to the light emitted by the light source than the light transmissivity of the first light adjusting member and the light transmissivity of the second light adjusting member.

According to the present disclosure, a planar light source with reduced luminance non-uniformity in the emission face can be provided.

DETAILED DESCRIPTION

Figure 1:
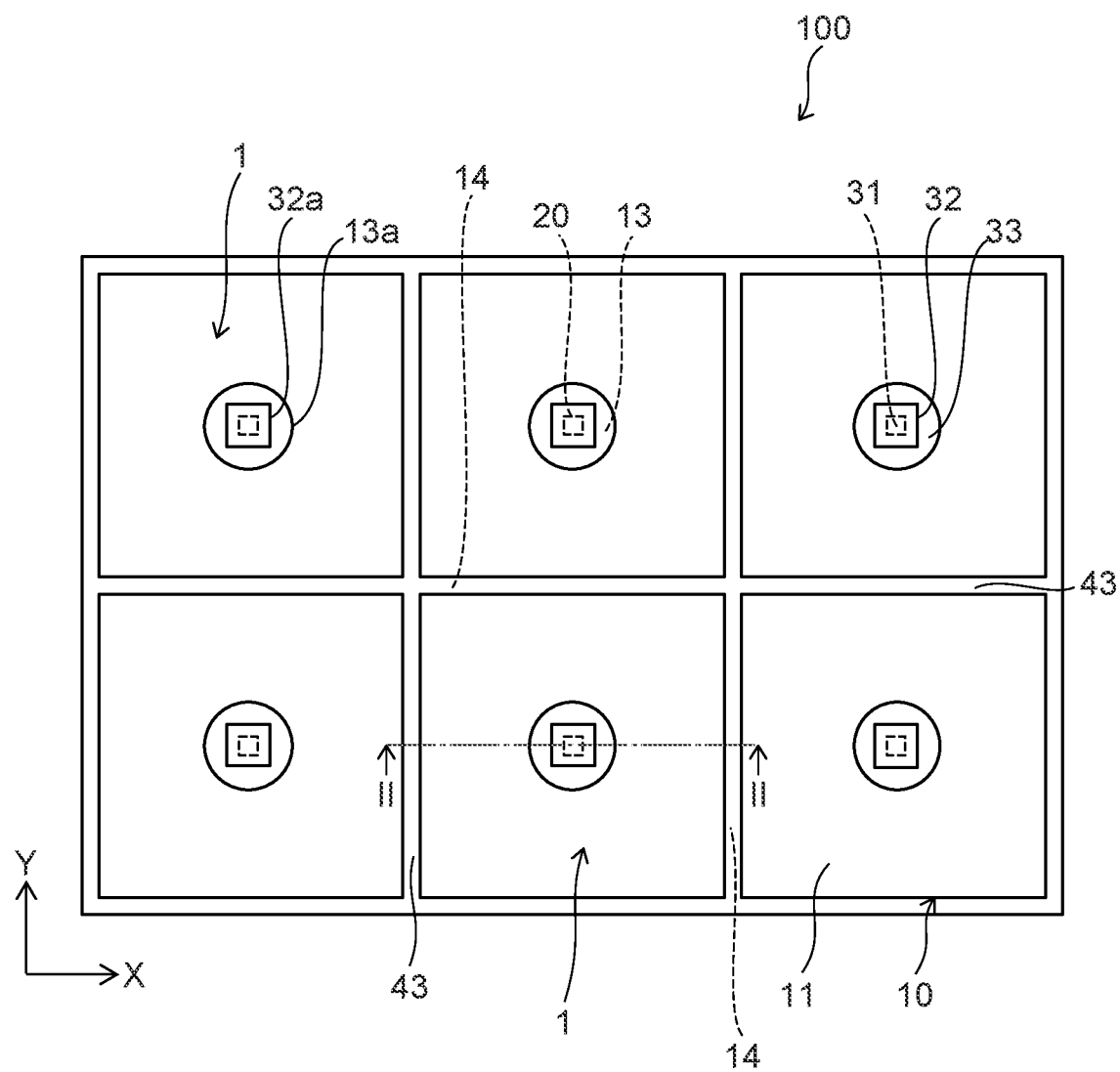
FIG. 1 is a schematic top view of a planar light source according to an embodiment of the present disclosure.

Certain embodiments will be explained below with reference to the accompanying drawings. In the drawings, the same elements are denoted with the same reference numerals.

FIG. 1 is a schematic top view of a planar light source 100 according to an embodiment of the present disclosure. FIG. 1 is a top view of the emission face of the planar light source 100. In FIG. 1, the two directions parallel to the emission face of the planar light source 100 that are orthogonal to one another are denoted as X and Y directions.

The planar light source 100 has a plurality of emission regions 1 arranged in the X and Y directions. The emission regions 1 each have a square outline having two sides extending along the X direction and two sides extending along the Y direction.

An emission region 1 can be a driving unit for local dimming, for example. The number of emission regions 1 configuring the planar light source 100 is not limited to that shown in FIG. 1. The planar light source 100 can be configured as one emission region 1.

Figure 2:
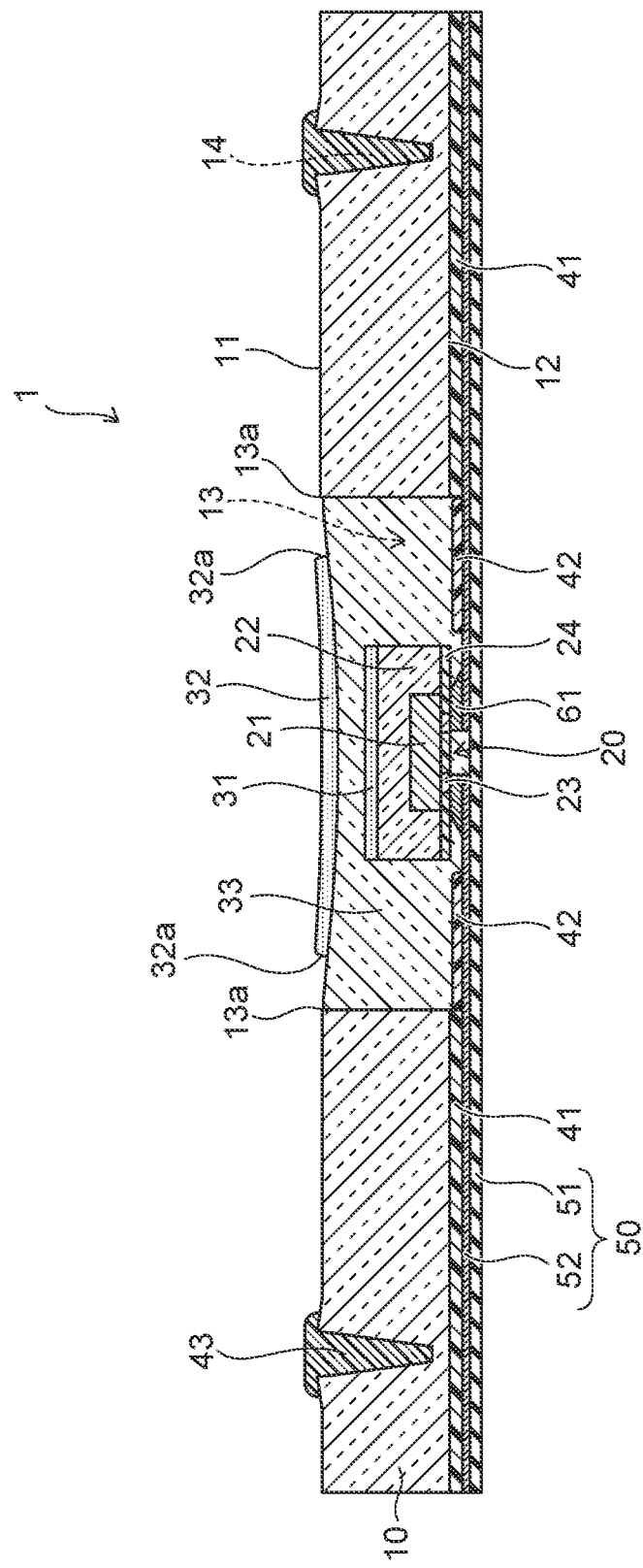
FIG. 2 is a schematic cross-sectional view taken along line II-II in FIG. 1.

FIG. 2 is a schematic cross-sectional view taken along line II-II in FIG. 1 showing a cross section of one emission region 1.

The emission region 1 includes a light guide member 10, a light source 20, a first light adjusting member 31, a second light adjusting member 32, a first light transmissive member 33, a first light reflecting member 41, a second light reflecting member 42, a partitioning member 43, and a wiring substrate 50.

The light guide member 10 has a light transmissivity with respect to the light emitted by the light source 20. The light source 20 has a light emitting element 21. The light emitted by the light source 20 substantially represents the light emitted by the light emitting element 21. In the case in which the light source 20 includes a phosphor, the light emitted by the light source 20 also includes the light emitted by the phosphor.

The material used for the light guide member 10 may include, for example, a thermoplastic resin, such as acrylic, polycarbonate, cyclic polyolefin, polyethylene terephthalate, polyester, or the like, a thermosetting resin, such as epoxy, silicone, or the like, and glass or the like.

The light guide member 10 has a first face 11 which serves as the emission face of the planar light source 100, and a second face 12 opposing the first face 11. Furthermore, the light guide member 10 has a through hole 13 passing through from the first face 11 to the second face 12. The light source 20 is disposed in the through hole 13.

The thickness of the light guide member 10 is preferably 200 μm to 800 μm. The light guide member 10 may have a single layer structure or multilayer structure in the thickness direction. In the case in which the light guide member 10 has a multilayer structure, a light transmissive adhesive layer can be disposed between the layers. Different types of main materials can be used for the layers in the multilayer structure.

Figure 3A:
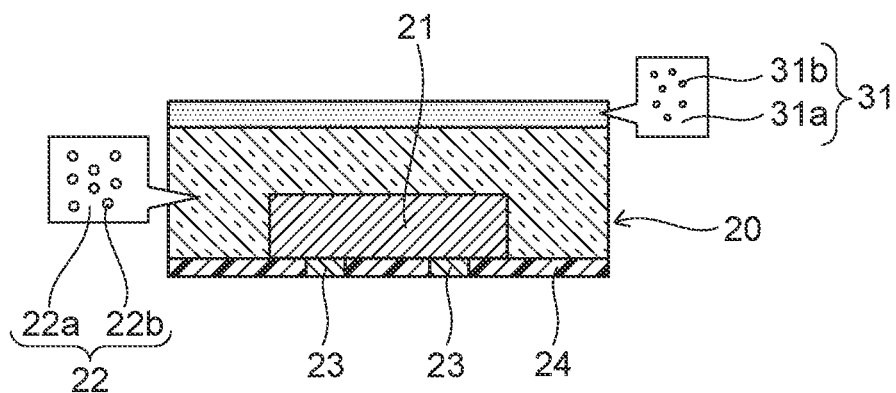
FIG. 3A is a schematic cross-sectional view of a light source according to an embodiment of the present disclosure.

FIG. 3A is a schematic cross-sectional view of a light source 20.

The light source 20 includes a light emitting element 21. The light emitting element 21 has a semiconductor stack structure. The light emitting element 21 includes, for example, $In_xAl_yGa_{1-x-y}N$ ($0 \leq x$, $0 \leq y$, $x+y \leq 1$) as the semiconductor stack structure, and can emit blue light. For the light emitting element 21, an element emitting light having a color other than blue (e.g., ultraviolet light) can be used.

A second light transmissive member 22 may cover the upper face and the lateral faces of the light emitting element 21. The second light transmissive member 22 may be formed of a light transmissive resin 22a. The second light transmissive member 22 may contain a phosphor 22b dispersed in the light transmissive resin 22a.

The light transmissive resin 22a is, for example, a silicone resin or epoxy resin. The phosphor 22b can be excited by the light emitted by the light emitting element 21 and emit light having a different wavelength from a wavelength of the light emitted by the light emitting element 21. For the phosphor 22b, for example, YAG phosphors, β-SiAlON phosphors, fluoride-based phosphors, such as KSF-based phosphors, MGF-based phosphors, or the like, nitride phosphors, such as CASN-based phosphors or the like can be used. The phosphor can be a quantum dot phosphor. The second light transmissive member 22 can contain one type of phosphor, or several types of phosphors. The second light transmissive member 22 can have a single phosphor layer structure or multiple layer structure formed by stacking layers containing different types of phosphor.

A pair of positive and negative electrodes 23 may be formed on the lower face of the light emitting element 21. A cover member 24 may be provided on the lower face of the light emitting element 21, and the surfaces (lower faces in FIG. 3A) of the electrodes 23 may be exposed from the cover member 24. The cover member 24 may also be provided on the lower face of the second light transmissive member 22 that covers the lateral faces of the light emitting element 21.

The cover member 24 has reflectivity with respect to the light emitted by the light source 20. The cover member 24, for example, may be a white resin member containing a light diffusing material, such as titanium oxide, silica, alumina, zinc oxide, glass, or the like.

As shown in FIG. 2, a first light transmissive member 33 is provided in the through hole 13 of the light guide member 10. The first light transmissive member 33 has light transmissivity with respect to the light emitted by the light source 20, and may be formed, for example, by using the same resin as the material for the light guide member 10, or a resin having a smaller refractive index difference from that of the material for the light guide member 10. Alternatively, glass may be used as the material for the first light transmissive member 33.

The first light transmissive member 33 is provided between the lateral faces of the light source 20 and the light guide member 10. The lateral faces of the light source 20 and the first light transmissive member 33, as well as the light guide member 10 and the first light transmissive member 33 are in direct contact with one another. It is preferable to not form any space such as an air layer between the lateral faces of the light source 20 and the first light transmissive member 33 or between the light guide member 10 and the first light transmissive member 33.

The light source 20 may be disposed on the wiring substrate 50 in the through hole 13. The wiring substrate 50 may have an insulating base 51 and a wiring layer 52. Each electrode 23 of the light emitting element 21 may be bonded to the wiring layer 52 via a conductive bonding member 61. The bonding member 61, for example, is solder. The first light transmissive member 33 may also be provided between the light source 20 and the wiring substrate 50, and in the surrounding of the bonding members 61.

The wiring substrate 50 is adhered on a surface closer to the second face 12 than the first face 11 of the light guide member 10. A first light reflecting member 41 is disposed between the second face 12 of the light guide member 10 and the wiring substrate 50. The first light reflecting member 41 has reflectivity with respect to the light emitted by the light source 20. The first light reflecting member 41, for example, is a white polyethylene terephthalate sheet containing a light diffusing material, such as titanium oxide, silica, alumina, zinc oxide, or glass, or a white polyethylene terephthalate sheet containing a large number of air bubbles.

A second light reflecting member 42 is disposed on the surface of the wiring substrate 50 located at the bottom of the through hole 13 in the surrounding of the light source 20. The second light reflecting member 42, for example, is a white resin member containing a light diffusing material, such as titanium oxide, silica, alumina, zinc oxide, glass, or the like.

In a sheet of light guide member 10, a plurality of emission regions 1 are provided. As shown in FIG. 1, grooves 14 extending in the X and Y directions in a lattice pattern in the light guide member 10 are formed to compartmentalize the emission regions 1.

As shown in FIG. 2, a partitioning member 43 is disposed in the grooves 14. The partitioning member 43 has reflectivity with respect to the light emitted by the light source 20 and comprises, for example, a white resin material containing a light diffusing material, such as titanium oxide, silica, alumina, zinc oxide, glass, or the like. Alternatively, the partitioning member 43 may be a metal, such as Al, Ag, or the like.

The partitioning member 43 hinders light being guided between adjacent emission regions 1. For example, light guide is hindered from an emission region 1 in which light is emitted, to another emission region 1 in which light is not emitted. This can achieve local dimming using emission regions 1 as driving units.

In FIG. 2, the grooves 14 is filled with the partitioning member 43. The partitioning member 43 may be disposed in the form of a film along the inner faces of the grooves 14.

FIG. 2 shows the grooves 14 each having an opening on the first face 11, and are bottomed out before reaching the second face 12. Alternatively, the grooves 14 may extend through from the first face 11 to the second face 12. Alternatively, the grooves 14 may each have an opening on the second face 12, and are bottomed out before reaching the first face 11. Alternatively, the grooves may be hollow spaces created in the light guide member 10.

A first light adjusting member 31 is disposed on or above the upper face of the light source 20 in the through hole 13. The first light adjusting member 31 is located in the through hole 13. The first light adjusting member 31 may be integrally formed with the light source 20. The first light adjusting member 31 may be in contact with the upper face of the light source 20 (i.e., the upper face of the second light transmissive member 22 in the example shown in FIG. 2) directly covering the upper face of the light source 20. Alternatively, another layer (e.g., a third light transmissive member or the like) may be interposed between the first light adjusting member 31 and the light source 20.

A second light adjusting member 32 is disposed above and apart from the first light adjusting member 31. The first light adjusting member 31 and the second light adjusting member 32 each have reflectivity and light transmissivity with respect to the light emitted by the light source 20. The light transmissivity of the first light transmissive member 33 with respect to the light emitted by the light source 20 may be set to two to 100 times the light transmissivity of the first light adjusting member 31 and the second light adjusting member 32.

The first light transmissive member 33 is disposed between the first light adjusting member 31 and the second light adjusting member 32, and the second light adjusting member 32 is disposed on the first light transmissive member 33. The first light transmissive member 33 has a higher light transmissivity with respect to the light from the light source 20 than the first light adjusting member 31 and the second light adjusting member 32.

As shown in FIG. 3A, the first light adjusting member 31 may be formed of a light transmissive resin 31a in which a light diffusing material 31b is dispersed. The light transmissive resin 31a is, for example, a silicone resin or epoxy resin. The light diffusing material 31b is, for example, titanium oxide, silica, alumina, zinc oxide, glass, or the like. Similar to the first light adjusting member 31, the second light adjusting member 32 may also be formed of a light transmissive resin in which a light diffusing material is dispersed.

The concentration of the light diffusing material in the second light adjusting member 32 may be lower than the concentration of the light diffusing material in the first light adjusting member 31. Accordingly, the light transmissivity of the second light adjusting member 32 with respect to the light emitted by the light source 20 is higher than the light transmissivity of the first light adjusting member 31 with respect to the light emitted by the light source 20.

Alternatively, the light transmissivity of the second light adjusting member 32 may be made lower than the light transmissivity of the first light adjusting member 31 by employing a thinner second light adjusting member 32 than the first light adjusting member 31.

The first light adjusting member 31 and the second light adjusting member 32 may each be, for example, a layer formed of a metal such as Al, Ag, or the like, or a dielectric multilayer film.

The first light adjusting member 31 may cover the entire upper face of the light source 20. The first light adjusting member 31 does not extend beyond the upper face of the light source 20. Accordingly, the planar size of the first light adjusting member 31 is the same as the planar size of the light source 20 in a top view.

In the top view of the emission regions 1 shown in FIG. 1, the distance between two opposing sides of a second light adjusting member 32 is larger than the distance between two opposing sides of a first light adjusting member 31. The distance between two opposing sides here represents the distance between two opposing sides in the X direction, the distance between two opposing sides in the Y direction, and the distance between two opposing sides oblique to these directions. In other words, the planar size of a second light adjusting member 32 is larger than the planar size of a first light adjusting member 31 in the top view, and each second light adjusting member 32 spreads so as to indirectly cover a first light adjusting member 31 entirely via the first light transmissive member 33.

The perimeters 32a of the second light adjusting members 32 are located inward of and apart from the edge 13a of the light guide member 10 defining the through holes 13. In other words, no second light adjusting member 32 straddles the border between the light guide member 10 and the first light transmissive member 33. Even in the case in which there is a large difference between the coefficients of thermal expansion between the light guide member 10 and the first light transmissive member 33, the second light adjusting member 32 which is not positioned over the border of the light guide member 10 and the first light transmissive member 33 is not affected by the stress attributable to the thermal expansion coefficient difference between them. This can suppress the second light adjusting member 32 from being delaminated or having cracks.

The first light adjusting member 31 diffuses and reflects a portion of the light exiting directly above the light source 20 while transmitting another portion of the light. This can moderate the luminance in the region directly above the light source 20 in the emission face of an emission region 1 such that the luminance is not excessively higher as compared to that of the remaining area. However, in this case, the luminance of the area directly above the light source 20 may become excessively lower than the other area.

Accordingly, in this embodiment, the second light adjusting member 32 is provided above and apart from the first light adjusting member 31, while interposing the first light transmissive member 33 which has a higher light transmissivity than the first light adjusting member 31 and the second light adjusting member 32. The light emitted by the light source 20 and the light reflected by the second light reflecting member 42 in the through hole 13 is guided to the first light transmissive member 33 interposed between the first light adjusting member 31 and the second light adjusting member 32. A portion of the light guided to the first light transmissive member 33 is diffused and reflected by the second light adjusting member 32, and another portion transmits through the second light adjusting member 32.

This may not allow the region directly above the light source 20 to have excessively high or low luminance, thereby reducing the luminance non-uniformity in the emission face of the emission region 10.

Because the transmission of a portion of the light exiting directly above the light source 20 is reduced by the first light adjusting member 31, it is desirable for the light transmissivity of the second light adjusting member 32 to be set higher than the light transmissivity of the first light adjusting member 31 such that the luminance of the region directly above the light source 20 will not become excessively low.

In order to reduce a rapid change occurring in the in-plane luminance near the area directly above the light source 20, it is desirable to make the distance between two opposing sides of the second light adjusting member 32 larger than the distance between two opposing sides of the first light adjusting member 31 in the top view.

The cover member 24 disposed on the lower face of the light source 20 and the second light reflecting member 42 disposed on the surface of the wiring substrate 50 around the light source 20 can reduce that the wiring substrate 50 near the light source 20 is irradiated to the light emitted by the light source 20, thereby suppressing the degradation of the wiring substrate 50. The light reflecting cover member 24 and the second light reflecting member 42 reflect the light towards the first face 11 which is the emission face of the emission region 1, thereby increasing the luminance of the light extracted from the first face 11.

In the light guide member 10 between the first face 11 and the first light reflecting member 41 disposed on the second face 12, the light from the light source 20 is guided towards the partitioning member 43 while being repeatedly reflected by the first face 11 and the first light reflecting member 41. In the light guide member 10 between the first light reflecting member 41 and the first face 11, one portion of the light advancing towards the first face 11 is extracted from the light guide member 10 through the first face 11.

By allowing the first light transmissive member 33 in the through hole 13 to contain a phosphor as needed, the color tone of the emission in the emission region 1 can be corrected.

Figure 3B:
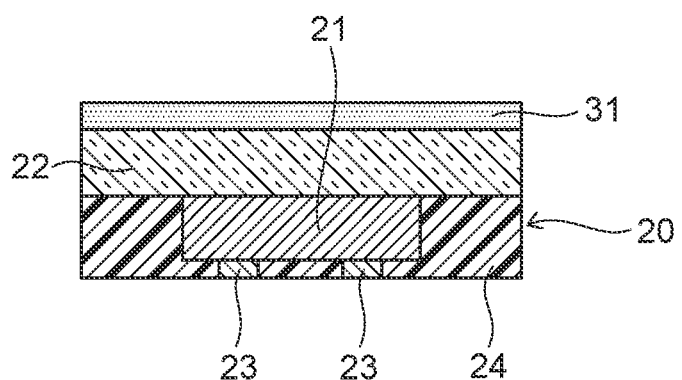
FIG. 3B is a schematic cross-sectional view of a light source according to an embodiment of the present disclosure.

FIG. 3B is a schematic cross-sectional view of another example of the light source 20.

In the light source 20 shown in FIG. 3B, a cover member 24 covers the lateral faces and the lower face of the light emitting element 21. A second light transmissive member 22 is disposed on the upper face of the light emitting element 21. The second light transmissive member 22 is also disposed on or above the cover member 24 that covers the lateral faces of the light emitting element 21.

In the example shown in FIG. 2, the upper face of the first light transmissive member 33 has a concave shape, and the upper face of the second light adjusting member 32 is formed along the upper face of the first light transmissive member 33.

Figure 4A:
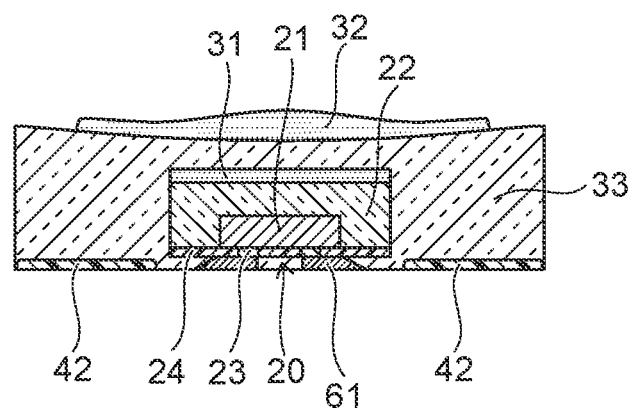
FIG. 4A is a schematic cross-sectional view of another example of the second light adjusting member in a planar light source according to an embodiment of the present disclosure.
Figure 4B:
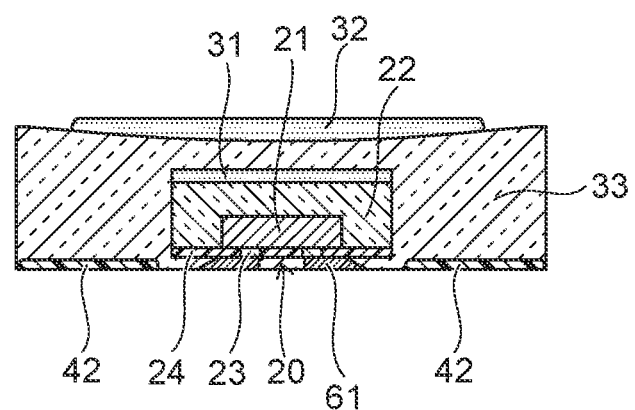
FIG. 4B is a schematic cross-sectional view of another example of the second light adjusting member in a planar light source according to an embodiment of the present disclosure.

FIG. 4A and FIG. 4B are schematic cross-sectional views of the portion where a light source 20 is arranged in other examples of the planar light source according to the embodiment.

In the example shown in FIG. 4A, the upper face of the second light adjusting member 32 has a projected portion in the center, making the thickness of the central portion of the second light adjusting member 32 larger than the other portion.

In the example shown in FIG. 4B, the upper face of the first light transmissive member 33 has a concave shape, but the upper face of the second light adjusting member 32 is flat. Accordingly, the thickness of the second light adjusting member 32 in the central portion is larger than the other portion.

Figure 5:
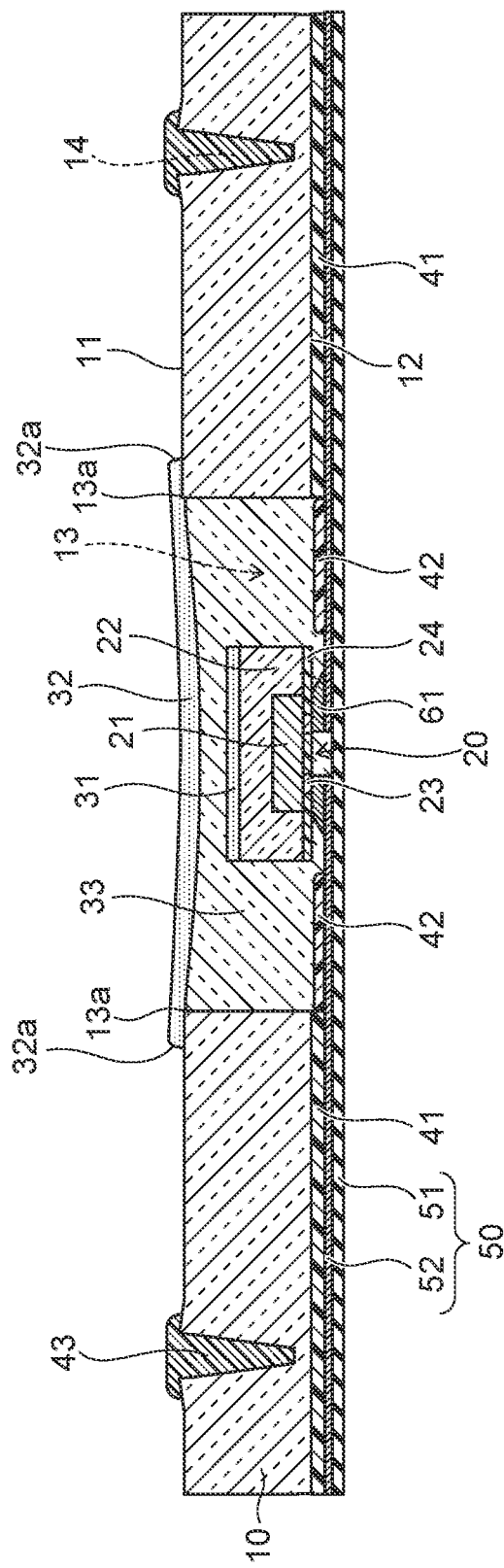
FIG. 5 a schematic cross-sectional view of a planar light source according to another embodiment of the present disclosure.

In the case in which the light guide member 10 and the first light transmissive member 33 are of the same material, or the thermal expansion coefficient difference between the light guide member 10 and the first light transmissive member 33 is small, the second light adjusting member 32 can be formed to straddle the border between the light guide member 10 and the first light transmissive member 33 as shown in FIG. 5. The perimeter 32a of the second light adjusting member 32 is positioned outward of the edge 13a of the light guide member 10 defining the through hole 13.

Figure 6:
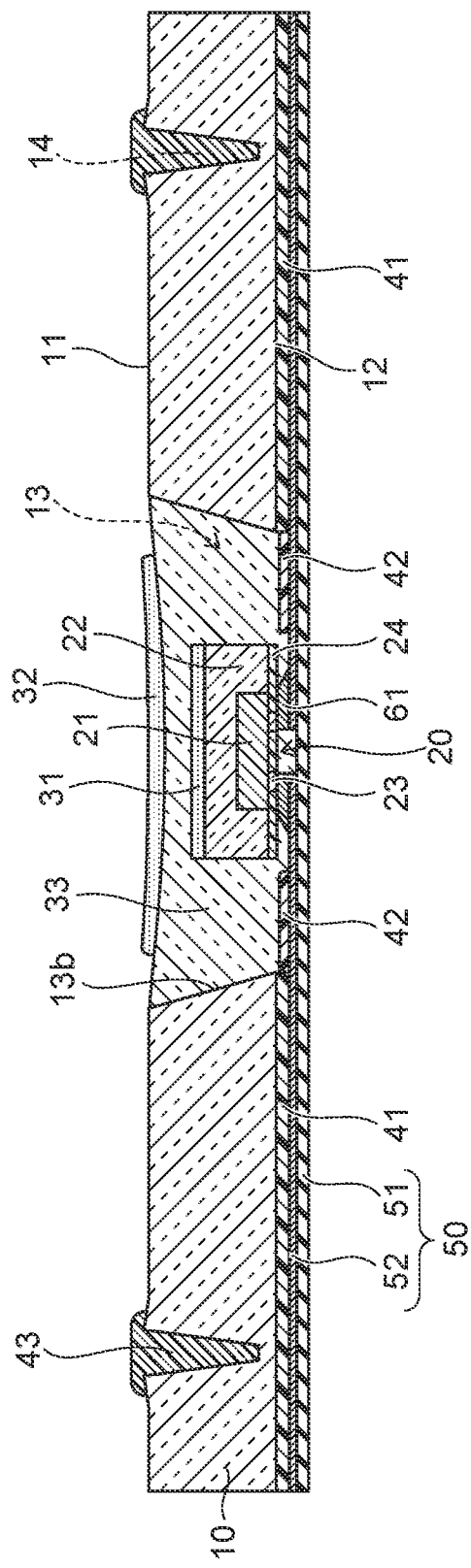
FIG. 6 is a schematic cross-sectional view of a planar light source according to another embodiment of the present disclosure.

FIG. 6 is a schematic cross-sectional view of a planar light source according to another embodiment of the present disclosure.

In the example shown in FIG. 6, the lateral wall 13b of the through hole 13 is oblique to the first face 11 and the second face 12 of the light guide member 10. The lateral wall 13b of the through hole 13 forms an obtuse angle with the first face 11 of the light guide member 10, and an acute angle with the second face 12 of the light guide member 10. The lower edge of the lateral wall 13b of the through hole 13 is positioned closer to the light source 20 than the upper edge of the lateral wall 13b of the through hole 13. Accordingly, the first light reflecting member 41 disposed on the second face 12 can be positioned closer to the light source 20. This can increase the component of light reflected by the first light reflecting member 41 to thereby improve the luminance.

Figure 7:
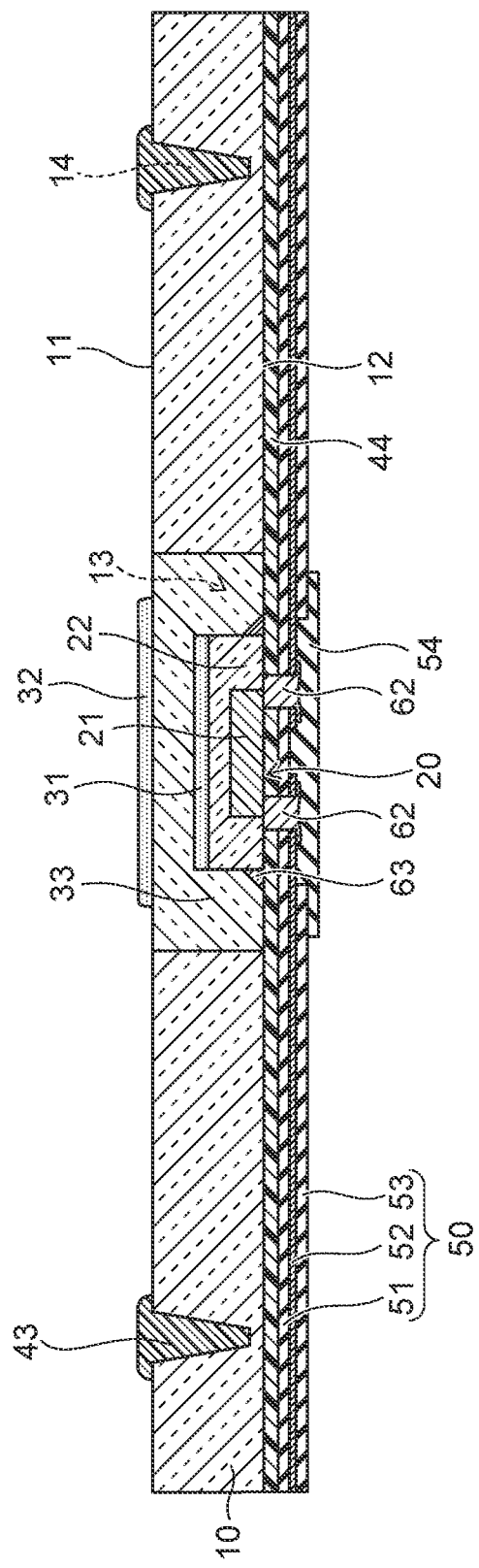
FIG. 7 is a schematic cross-sectional view of a planar light source according to another embodiment of the present disclosure.

FIG. 7 is a schematic cross-sectional view of a planar light source according to another embodiment the present disclosure.

The wiring substrate 50 of the planar light source shown in FIG. 7 has an insulating base 51, a wiring layer 52, and a cover layer 53. The wiring layer 52 is disposed on the lower face of the insulating base 51, and the cover layer 53 covers the surface of the wiring layer 52. The cover layer 53 is, for example, a resin layer.

A light reflecting member 44 is disposed on the wiring substrate 50. The light reflecting member 44 is, for example, a white polyethylene terephthalate sheet containing a light diffusing material, such as titanium oxide, silica, alumina, zinc oxide, or glass, or a white polyethylene terephthalate sheet containing a large number of air bubbles.

The light reflecting member 44 is disposed between the insulating base 51 of the wiring substrate 50 and the second face 12 of the light guide member 10. The light reflecting member 44 is also positioned between the lower face of the first light transmissive member 33 in the through hole 13 and the insulating base 51 of the wiring substrate 50.

The light reflecting member 44 is also positioned between the lower face of the light source 20 and the insulating base 51 of the wiring substrate 50. The light source 20 is bonded to the upper face of the light reflecting member 44 using an adhesive material 63. The adhesive material 63 is, for example, a resin material.

Joining members 62 are disposed through the light reflecting member 44, the insulating base 51, and the wiring layer 52 in the region directly under the light source 20. The joining members 62 join the electrodes of the light emitting element 21 and the wiring layer 52. The joining members 62 are formed of, for example, solder.

The joining members 62 and portions of the wiring layer 52 near the joining member 62 are exposed from the cover layer 53. The exposed portions of the wiring layer 52 and the joining members 62 are covered by a resist 54.

Figure 8:
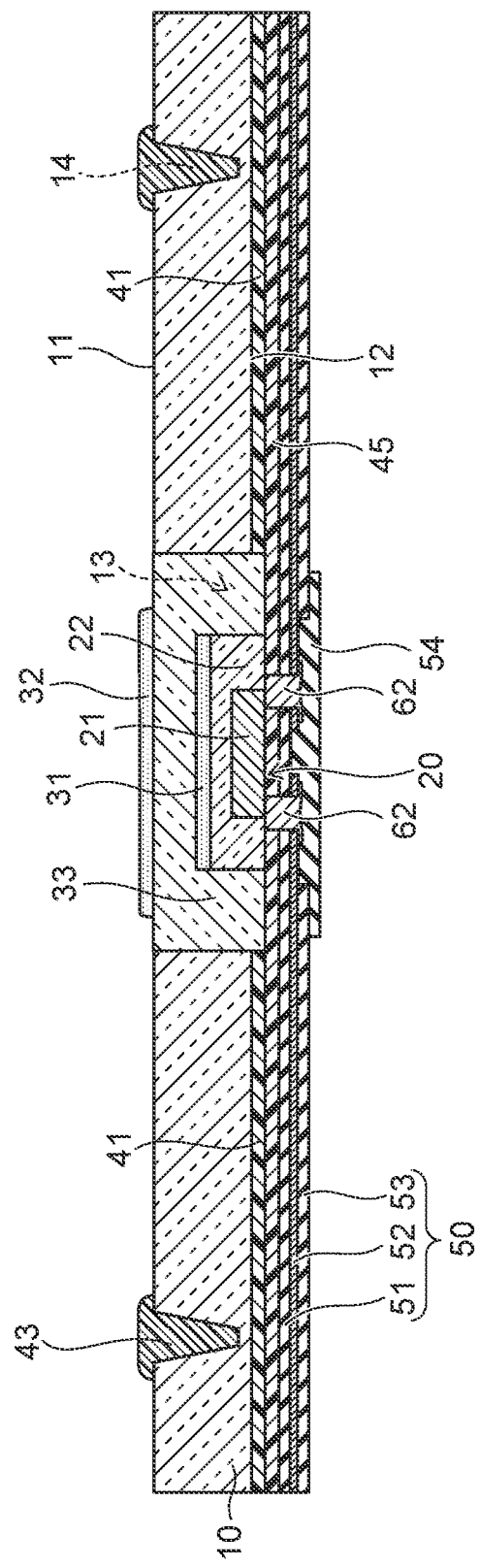
FIG. 8 is a schematic cross-sectional view of a planar light source according to another embodiment of the present disclosure.

Alternatively, as shown in FIG. 8, the light source 20 may be placed on a white adhesive sheet 45 disposed on the insulting base 51 of the wiring substrate 50. A first light reflecting member 41 is disposed between the adhesive sheet 45 and the second face 12 of the light guide member 10.

Figure 9:
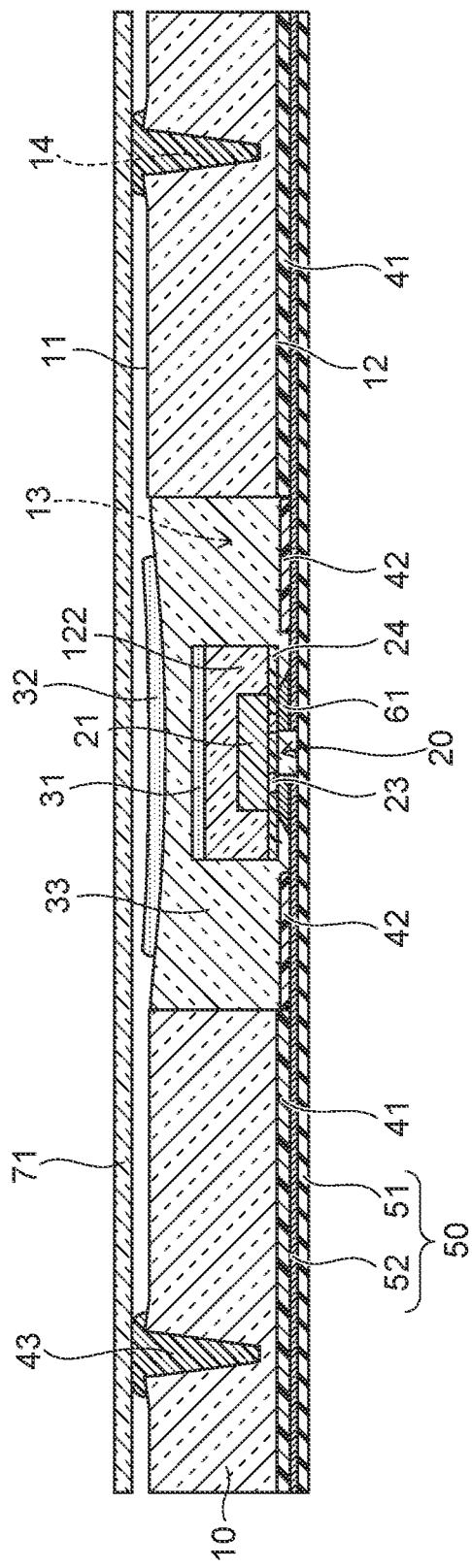
FIG. 9 is a schematic cross-sectional view of a planar light source according to another embodiment of the present disclosure.

FIG. 9 is a schematic cross-sectional view of a planar light source according to another embodiment of the present disclosure.

The light source 20 includes a light emitting element 21 and a second light transmissive member 122 covering the upper face and the lateral faces of the light emitting element 21. The second light transmissive member 122 is, for example, a light transmissive resin containing substantially no phosphor. A phosphor sheet 71 is disposed on the first face 11 of the light guide member 10. The phosphor sheet 71 is a resin sheet containing a phosphor.

As shown in FIG. 1, the first face 11 of an emission region 1 partitioned by the partitioning member 43 (grooves 14) is formed as a square having four corners, and the planar shapes of the light source 20 and the second light adjusting member 32 are also formed as squares having four corners. In the top view shown in FIG. 1, the corners of the light source 20 and the second light adjusting member 32 face the corners of the first face 11.

Figure 10:
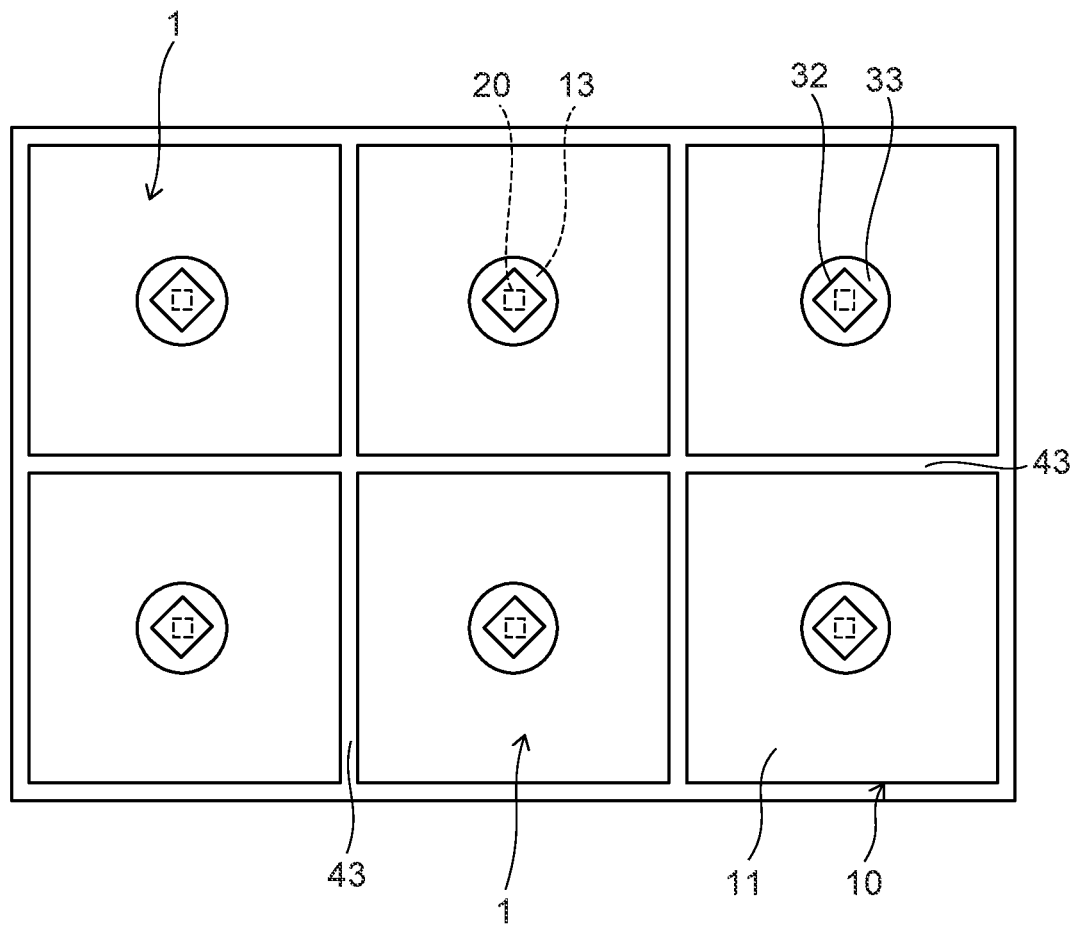
FIG. 10 is a schematic top view of a planar light source according to another embodiment of the present disclosure.

Alternatively, as in the top view shown in FIG. 10, the second light adjusting members 32 can be rotated by 45 degrees from the state shown in FIG. 1, for example, such that the diagonal lines connecting corners of the first faces 11 intersect the lateral faces (or the sides) of the second light adjusting members 32. In FIG. 1, the corners of the second light adjusting members 32 are not positioned on the diagonal lines connecting the corners of the first faces 11. With such a configuration, the light from the light sources 20 may readily extend to the four corners of the emission regions 1.

Furthermore, the light sources 20 may also be rotated by 45 degrees such that the diagonal lines connecting the corners of the first faces 11 intersect the lateral faces (or the sides) of the light sources 20.

Figure 11:
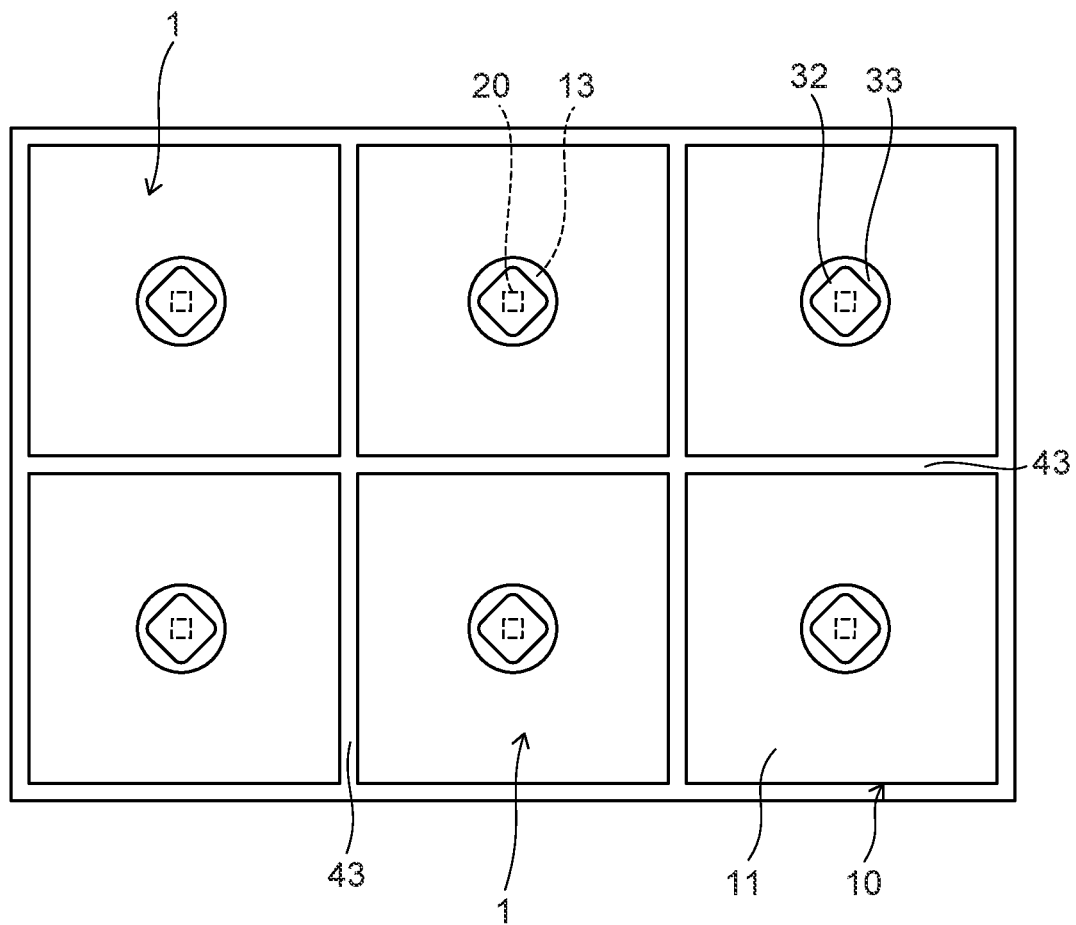
FIG. 11 is a schematic top view of a planar light source according to another embodiment of the present disclosure.

As shown in FIG. 11, the corners of the second light adjusting members 32 may be rounded.

The semiconductor stack structure of a light emitting element 21 may include at least one emission layer capable of emitting light having any of the colors described above. For example, the semiconductor stack structure may include one or more emission layers between an n-type semiconductor layer and a p-type semiconductor layer. An emission layer may have a structure having a single active layer, such as in a double heterostructure or single quantum well structure (SQW), or a structure having a groups of active layers such as in a multiquantum well structure (MQW).

The semiconductor stack structure may include a plurality of emission layers. For example, the semiconductor stack structure may be a structure that includes a plurality of emission layers between an n-type semiconductor layer and a p-type semiconductor layer, or one that repeatedly stacks a structure which successively includes an n-type semiconductor layer, an emission layer, and a p-type semiconductor layer. The multiple emission layers may include a layer having a different or the same emission color. The same emission color may include a range of colors that may be deemed as the same emission color for the purpose of use, for example, the dominant wavelengths may have variations of about several nanometers. An emission color combination may be suitably selected. Examples of emission color combinations in the case in which the semiconductor stack structure includes two emission layers include blue light and blue light, green light and green light, red light and red light, ultraviolet light and ultraviolet light, blue light and green light, blue light and red light, green light and red light, and the like.

A light source may include a plurality of light emitting elements having different peak emission wavelengths. Certain light sources including a plurality of light emitting elements having different peak emission wavelengths will be explained below with reference to FIG. 12A to FIG. 15C.

Figure 12A:
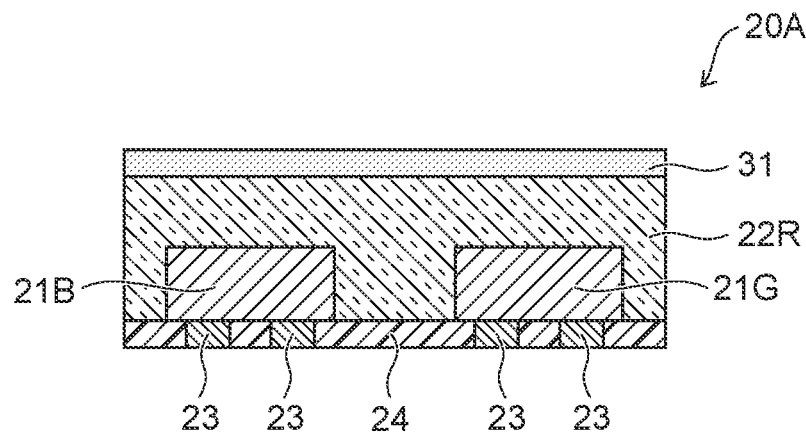
FIG. 12A is a schematic cross-sectional view of another example of the light source according to an embodiment of the present disclosure.

The light source 20A shown in FIG. 12A includes a first light emitting element 21B and a second light emitting element 21G disposed side by side. The first light emitting element 21B emits blue light, and the second light emitting element 21G emits green light.

The light source 20A further includes a phosphor layer 22R. The phosphor layer 22R covers the upper face of the first light emitting element 21B, the lateral faces of the first light emitting element 21B, the upper face of the second light emitting element 21G, and the lateral faces of the second light emitting element 21G. The phosphor layer 22R collectively encapsulates the first light emitting element 21B and the second light emitting element 21G. The phosphor layer 22R includes a light transmissive resin, and a red emitting phosphor dispersed in the light transmissive resin. The red emitting phosphor is excited by the lights emitted by the first light emitting element 21B and the second light emitting element 21G, and emits red light.

The light source 20A further includes a cover member 24 and a first light adjusting member 31 configured in a similar manner to the light source according to the embodiments described above. The first light adjusting member 31 is disposed on the phosphor layer 22R. The cover member 24 is disposed on the lower face of the first light emitting element 21B while exposing the surfaces of the electrodes 23 of the first light emitting element 21B, and on the lower face of the second light emitting element 21G while exposing the surfaces of the electrodes 23 of the second light emitting element 21G.

Figure 12B:
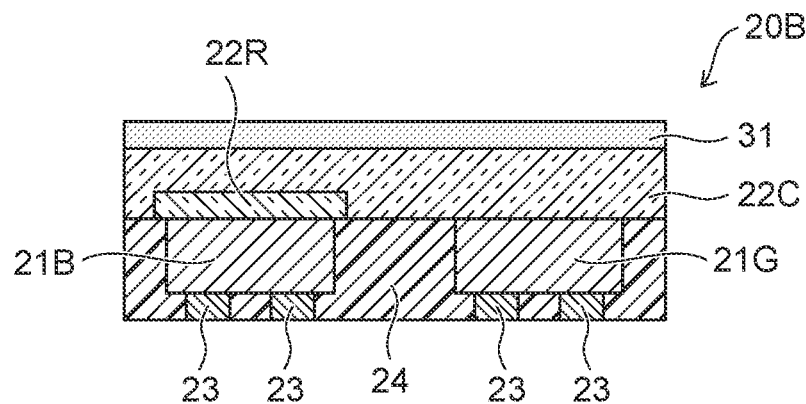
FIG. 12B is a schematic cross-sectional view of another example of the light source according to an embodiment of the present disclosure.
Figure 12C:
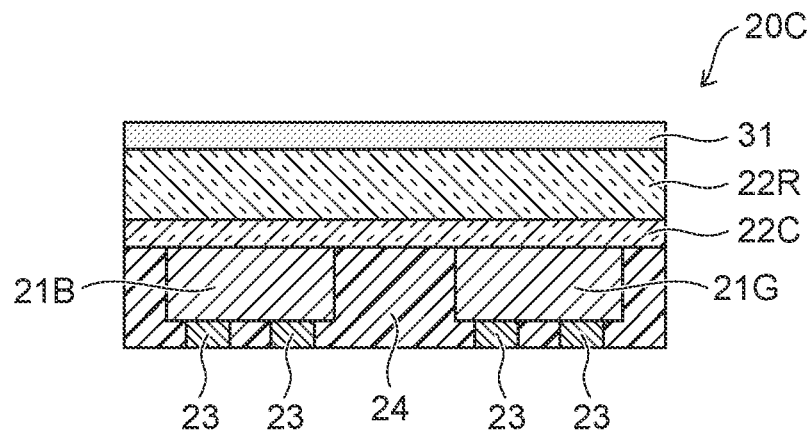
FIG. 12C is a schematic cross sectional view of another example of the light source according to an embodiment of the present disclosure.

The light source 20B shown in FIG. 12B and the light source 20C shown in FIG. 12C, similar to the light source 20A, each include a first light emitting element 21B, a second light emitting element 21G, a phosphor layer 22R, a cover member 24, and a first light adjusting member 31.

In the light source 20B shown in FIG. 12B, the cover member 24 covers the lower face of the first light emitting element 21B, the lateral faces of the first light emitting element 21B, the lower face of the second light emitting element 21G, and the lateral faces of the second light emitting element 21G. The cover member 24 is also disposed between the first light emitting element 21B and the second light emitting element 21G.

The light source 20B further includes a light transmissive member 22C disposed on the first light emitting element 21B, the second light emitting element 21G, and the cover member 24. The light transmissive member 22C is, for example, a light transmissive resin material. The phosphor layer 22R is disposed on the first light emitting element 21B, but not on the second light emitting element 21G. The light transmissive member 22C covers the phosphor layer 22R.

In the light source 20C shown in FIG. 12C, the cover member 24 covers the lower face of the first light emitting element 21B, the lateral faces of the first light emitting element 21B, the lower face of the second light emitting element 21G, and the lateral faces of the second light emitting element 21G. The light source 20C includes a light transmissive member 22C disposed on the first light emitting element 21B, the second light emitting element 21G, and the cover member 24. The phosphor layer 22R is disposed on the light transmissive member 22C, and the first light adjusting member 31 is disposed on the phosphor layer 22R.

The number of the first light emitting elements 21B or the second light emitting elements 21G to be included in one light source is not limited to one. The plurality of light emitting elements may be serially or parallelly connected. The light emitting elements may be connected to be independently drivable.

In a top view, the area of the first light emitting element 21B may be the same as, larger than, or smaller than the area of the second light emitting element 21G. In the case in which the first light emitting element 21B and the second light emitting element 21G are serially connected, appropriately setting the area(s) of the first light emitting element 21B and/or the second light emitting element 21G in the top view allows the light from the light emitting device to have a target color tone. In the top view, the area of the second light emitting element 21G is preferably larger than the area of the first light emitting element 21B. In general, the emission efficiency of the second light emitting element 21G which emits green light is lower than the emission efficiency of the first light emitting element 21B which emits blue light. Accordingly, making the area of the second light emitting element 21G larger than the area of the first light emitting element 21B in the top view can increase the intensity of the light from the second light emitting element 21G which has lower emission efficiency than the first light emitting element 21B.

Figure 13A:
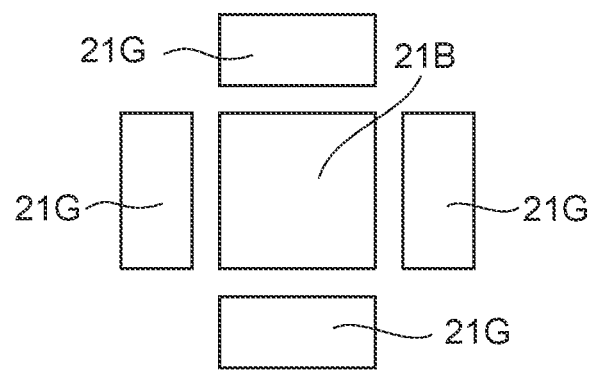
FIG. 13A is a schematic top view of another example of the light source according to an embodiment of the present disclosure.
Figure 13B:
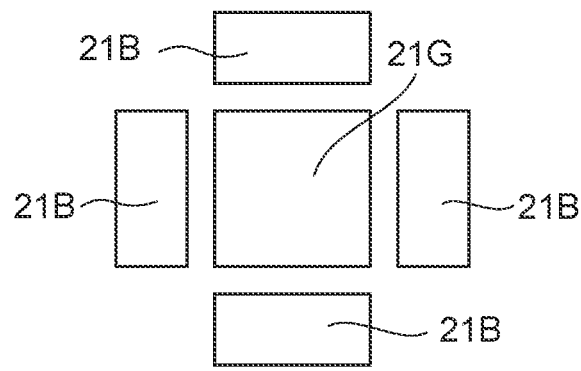
FIG. 13B is a schematic top view of another example of the light source according to an embodiment of the present disclosure.
Figure 13C:
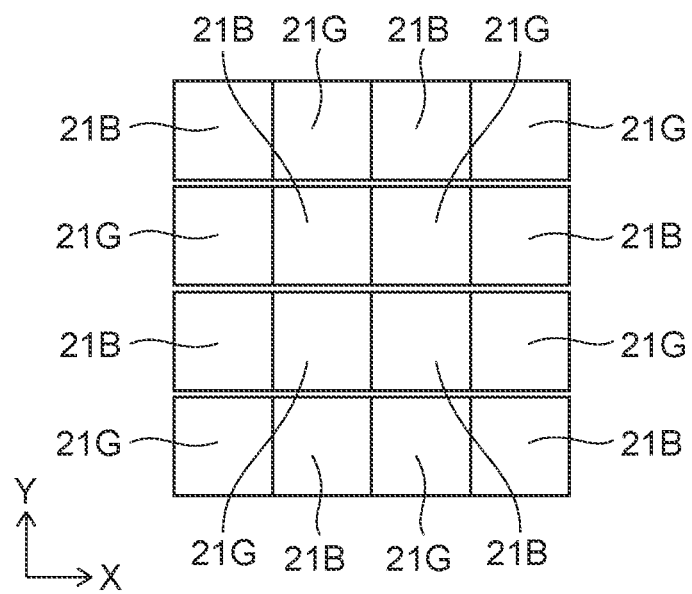
FIG. 13C is a schematic top view of another example of the light source according to an embodiment of the present disclosure.

FIG. 13A to FIG. 13C are schematic top views showing examples of the arrangements of the first light emitting elements 21B and the second light emitting elements 21G.

In the example shown in FIG. 13A, four second light emitting elements 21G are arranged around a first light emitting element 21B. In the example shown in FIG. 13B, the positions are revered, i.e., four first light emitting elements 21B are arranged around a second light emitting element 21G.

In the example shown in FIG. 13C, a plurality of first light emitting elements 21B and a plurality of second light emitting elements 21G are arranged in a matrix. The first light emitting elements 21B and the second light emitting elements 21G are alternately arranged in the X direction and the Y direction which is orthogonal to the X direction. Four second light emitting elements 21G are arranged around a first light emitting element 21B that is not positioned at an edge. Also four first light emitting elements 21B are arranged around one second light emitting element 21G that is not positioned at an edge.

In any of the light sources shown in FIG. 12A to FIG. 13C, the combination of emission colors of the light emitting elements included in a light source is not limited to blue light and green light. Examples of combinations include blue light and blue light, green light and green light, red light and red light, ultraviolet light and ultraviolet light, blue light and red light, green light and red light, and the like.

Figure 14A:
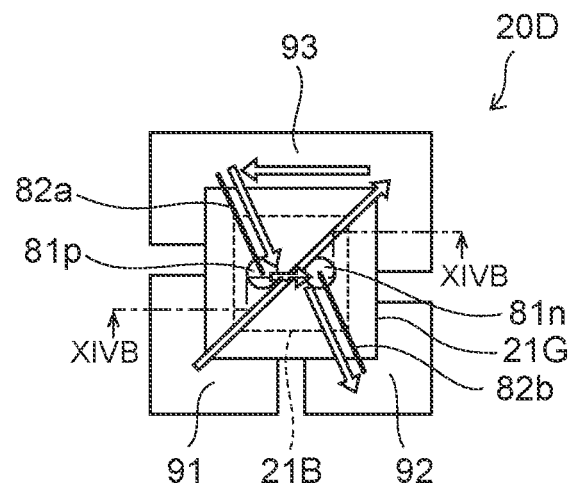
FIG. 14A is a schematic top view of another example of the light source according to an embodiment of the present disclosure.

The light source 20D shown in FIG. 14A includes a first lead 91, a second lead 92, and a third lead 93. The light source 20D includes a first light emitting element 21B which emits blue light, and a second light emitting element 21G which emits green light disposed on or above the first light emitting element 21B. The positions of the first and second light emitting elements can be changed in the light source. For example, the light source can include a second light emitting element which emits green light and a first light emitting element which emits blue light disposed on or above the second light emitting element.

The first lead 91 is spaced apart from the second lead 92. The first lead 91 is spaced apart from the third lead 93. The second lead 92 is spaced apart from the third lead 93.

Figure 14B:
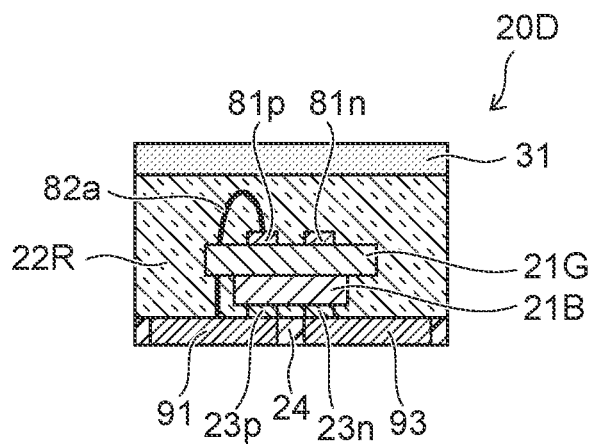
FIG. 14B is a schematic cross-sectional view taken along line XIVB-XIVB in FIG. 14A.

FIG. 14B is a schematic cross-sectional view taken along line XIVB-XIVB in FIG. 14A. In FIG. 14A, only the first light emitting element 21B, the second light emitting element 21G, the first lead 91, the second lead 92, the third lead 93, the positive electrode 81p, the negative electrode 81n, and the wire 82a of the light source 20D in FIG. 14B are shown.

The first light emitting element 21B includes a positive electrode 23p and a negative electrode 23n. The positive electrode 23p and the negative electrode 23n are provided on the lower face of the first light emitting element 21B. The second light emitting element 21G has a positive electrode 81p and a negative electrode 81n. The positive electrode 81p and the negative electrode 81n are formed on the upper face of the second light emitting element 21G.

The positive electrode 23p of the first light emitting element 21B is bonded to the first lead 91. The negative electrode 23n of the first light emitting element 21B is bonded to the third lead 93. The positive electrode 81p of the second light emitting element 21G is connected to the third lead 93 using a wire 82a. The negative electrode 81n of the second light emitting element 21G is connected to the second lead 92 using a wire 82b.

The lateral faces of each of the leads 91 to 93 are covered by the cover member 24. The lower face of each of the leads 91 to 93 is exposed from the cover member 24.

A phosphor layer 22R is disposed on the leads 91 to 93 and the cover member 24. The phosphor layer 22R covers the first light emitting element 21B, the second light emitting element 21G, the wires 82a and 82b, and the electrodes 23p, 23n, 81p, and 81n. A first light adjusting member 31 is disposed on the phosphor layer 22R.

The flow of electric current in the light source 20D is schematically indicated by using block arrows. The electric current flows from the first lead 91 to the second lead 92 via the positive electrode 23p of the first light emitting element 21B, the emission layer of the first light emitting element 21B, the negative electrode 23n of the first light emitting element 21B, the third lead 93, the wire 82a, the positive electrode 81p of the second light emitting element 21G, the emission layer of the second light emitting element 21G, the negative electrode 81n of the second light emitting element 21G, and the wire 82b.

The lower face of the first light emitting element 21B may have a retaining part electrically insulated from the emission layer of the first light emitting element 21B. Allowing the retaining part of the first light emitting element 21B to come into contact with the first lead 91, the second lead 92, the third lead 93 and/or the cover member 24 can suppress the first light emitting element 21B from tilting when the first light emitting element 21B is disposed on the leads.

Figure 15A:
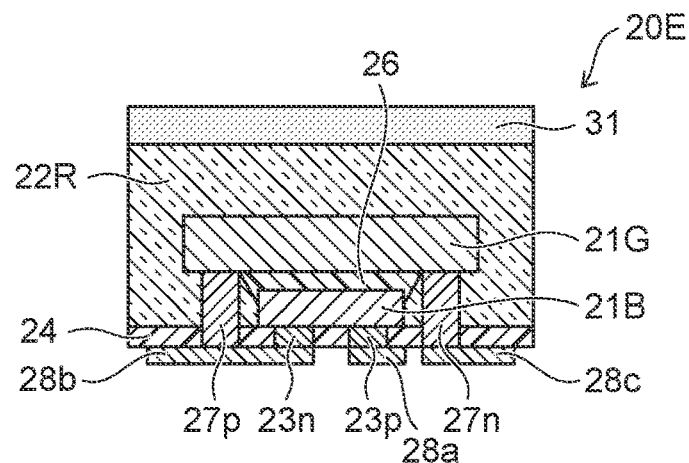
FIG. 15A is a schematic cross-sectional view of another example of the light source according to an embodiment of the present disclosure.
Figure 15B:
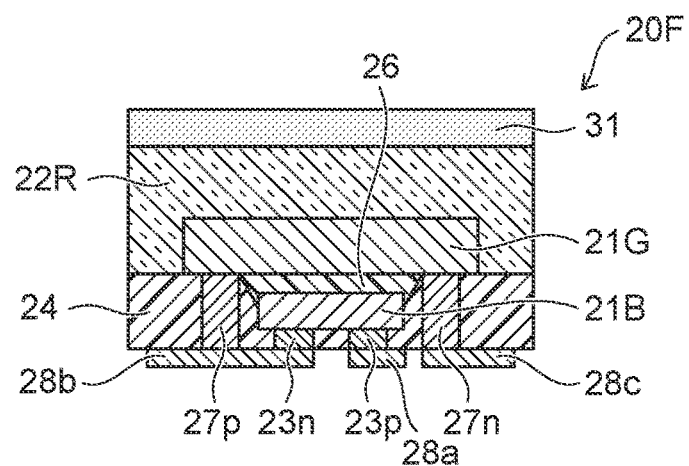
FIG. 15B is a schematic cross-sectional view of another example of the light source according to an embodiment of the present disclosure.
Figure 15C:
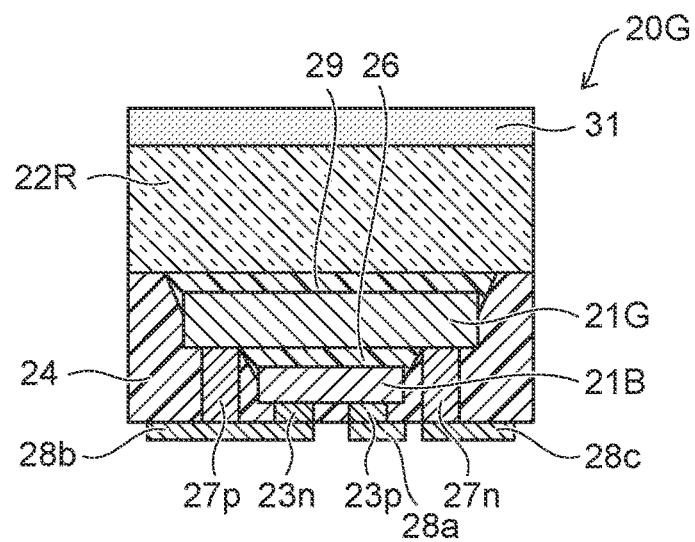
FIG. 15C is schematic cross-sectional view of another example of the light source according to an embodiment of the present disclosure.

The light sources shown in FIG. 15A to FIG. 15C also have a structure in which a first light emitting element 21B which emits blue light and a second light emitting element 21G which emits green light are stacked. The positions of the first light emitting element and the second light emitting element can be changed. The second light emitting element 21G is disposed on the first light emitting element 21B via a light transmissive adhesive member 26.

The first light emitting element 21B includes a positive electrode $23p$ and a negative electrode $23n$. The positive electrode $23p$ and the negative electrode $23n$ are formed on the lower face of the first light emitting element 21B. The second light emitting element 21G includes a positive electrode $2'7p$ and a negative electrode $27n$. The positive electrode $2'7p$ and the negative electrode $27n$ are formed on the lower face of the second light emitting element 21G.

In the light source 20E shown in FIG. 15A, the cover member 24 is disposed on the lower face of the first light emitting element 21B. On the lower face of the cover member 24, a first wire $28a$, a second wire $28b$, and a third wire $28c$ are disposed apart from one another.

On the cover member 24, a phosphor layer 22 is disposed to cover the first light emitting element 21B and the second light emitting element 21G. A first light adjusting member 31 is disposed on the phosphor layer 22R.

The lower face of the positive electrode $23p$ of the first light emitting element 21B is connected to the first wire $28a$. The lower face of the negative electrode $23n$ of the first light emitting element 21B is connected to the second wire $28b$. The positive electrode $2'7p$ of the second light emitting element 21G is connected to the second wire $28b$ through the phosphor layer 22R and the cover member 24. Accordingly, the negative electrode $23n$ of the first light emitting element 21B and the positive electrode $2'7p$ of the second light emitting element 21G are electrically connected through the second wire $28b$. The negative electrode $27n$ of the second light emitting element 21G is connected to the third wire $28c$ while piercing through the phosphor layer 22R and the cover member 24.

The electric current flows from the first wire $28a$ to the third wire $28c$ via the positive electrode $23p$ of the first light emitting element 21B, the emission layer of the first light emitting element 21B, the negative electrode $23n$ of the first light emitting element 21B, the second wire $28b$, the positive electrode $2'7p$ of the second light emitting element 21G, the emission layer of the second light emitting element 21G, and the negative electrode $27n$ of the second light emitting element 21G.

In the light source 20F shown in FIG. 15B, a cover member 24 is disposed to cover the first light emitting element 21B, the electrodes $27p$ and $27n$ of the second light emitting element 21G, and the adhesive member 26.

In the light source 20G shown in FIG. 15C, the cover member 24 further covers the second light emitting element 21G. A phosphor layer 22R is disposed on the second light emitting element 21G via a light transmissive adhesive member 29.

Certain embodiments of the present invention have been described in the foregoing with reference to specific examples. The present invention, however, is not limited to the specific examples. All forms implementable by a person skilled in the art by suitably making design changes based on any of the embodiments disclosed above also fall within the scope of the present invention so long as they encompass the subject matter of the present invention. Furthermore, various modifications and alterations within the spirit of the present invention that could have been made by a person skilled in the art are also considered as those falling within the scope of the present invention.

What is claimed is:

1. A planar light source comprising:
   a light guide member having a first face, a second face opposing the first face, and a through hole passing through from the first face to the second face;
   a light source disposed in the through hole of the light guide member;
   a first light adjusting member disposed on or above an upper face of the light source in the through hole, and having a light reflectivity and a light transmissivity with respect to light emitted by the light source;
   a second light adjusting member disposed above and apart from the first light adjusting member, and having a light reflectivity and a light transmissivity with respect to the light emitted by the light source;
   a first light transmissive member disposed between the first light adjusting member and the second light adjusting member, and between a lateral face of the light source and the light guide member, and having a higher light transmissivity with respect to the light emitted by the light source than the light transmissivity of the first light adjusting member and the light transmissivity of the second light adjusting member;
   a wiring substrate having an insulating base and a wiring layer;
   a light reflecting member disposed on the wiring substrate, the light reflecting member disposed between the insulating base of the wiring substrate and the second face of the light guide member, between a lower face of the first light transmissive member in the through hole and the insulating base of the wiring substrate, and between a lower face of the light source and the insulating base of the wiring substrate; and
   a joining member disposed through the light reflecting member and the insulating base in a region directly under the light source, the joining member connecting an electrode of the light source and the wiring layer,
   wherein a perimeter of the second light adjusting member is positioned outward of an edge of the through hole.

2. The planar light source according to claim 1, wherein the light transmissivity of the second light adjusting member with respect to the light emitted by the light source is higher than the light transmissivity of the first light adjusting member with respect to the light emitted by the light source.

3. The planar light source according to claim 2, wherein the first light adjusting member and the second light adjusting member each include a light transmissive resin in which a light diffusing material is contained, and
   a concentration of the light diffusing material in the second light adjusting member is lower than a concentration of the light diffusing material in the first light adjusting member.

4. The planar light source according to claim 1, wherein a distance between two opposite sides of the second light adjusting member is larger than a distance between two opposite sides of the first light adjusting member.

5. The planar light source according to claim 1, wherein the first light transmissive member contains a phosphor.

6. The planar light source according to claim 1, wherein the light source comprises:
a light emitting element provided with the electrode on a lower face of the light emitting element; and
a second light transmissive member covering an upper face and a lateral face of the light emitting element, and
the first light adjusting member is disposed on an upper face of the second light transmissive member.

7. The planar light source according to claim 6, wherein the second light transmissive member contains a phosphor.

8. The planar light source according to claim 1, wherein the light source comprises:
a light emitting element provided with the electrode on a lower face of the light emitting element;
a second light transmissive member covering an upper face of the light emitting element; and
a cover member covering a lateral face of the light emitting element, and having a light reflectivity with respect to the light emitted by the light source, and
the first light adjusting member is disposed on or above an upper face of the second light transmissive member.

9. The planar light source according to claim 1, wherein the light source is placed on an adhesive sheet disposed on the insulating base of the wiring substrate.

10. The planar light source according to claim 1, wherein grooves extend in a lattice pattern in the light guide member.

11. The planar light source according to claim 10, wherein the grooves extend through from the first face to the second face.

12. The planar light source according to claim 10, wherein the light reflecting member is disposed between the grooves and the insulating base of the wiring substrate.

13. The planar light source according to claim 1, wherein the light reflecting member contains a large number of air bubbles.

14. The planar light source according to claim 1, wherein the light source comprises:
a light emitting element provided with the electrode on a lower face of the light emitting element; and
a cover member disposed on the lower face of the light emitting element, the cover member having a light reflectivity with respect to the light emitted by the light source.

15. The planar light source according to claim 1, further comprising a phosphor sheet disposed above the first face of the light guide.

* * * * *